United States Patent
Bown

(10) Patent No.: US 9,947,237 B2
(45) Date of Patent: Apr. 17, 2018

(54) ELECTRONIC PUSH-BUTTON CONTRABASS TRAINER

(71) Applicant: Douglas Mark Bown, Johnston, IA (US)

(72) Inventor: Douglas Mark Bown, Johnston, IA (US)

( * ) Notice: Subject to any disclaimer, the term of this patent is extended or adjusted under 35 U.S.C. 154(b) by 0 days.

(21) Appl. No.: 15/282,669

(22) Filed: Sep. 30, 2016

(65) Prior Publication Data

US 2017/0092147 A1     Mar. 30, 2017

Related U.S. Application Data

(60) Provisional application No. 62/234,695, filed on Sep. 30, 2015.

(51) Int. Cl.
  *G10H 1/18*   (2006.01)
  *G09B 15/02*  (2006.01)
  *G09B 15/06*  (2006.01)

(52) U.S. Cl.
  CPC ........... *G09B 15/023* (2013.01); *G09B 15/06* (2013.01); *G10H 1/18* (2013.01)

(58) Field of Classification Search
  CPC ........................................................ G10H 1/18
  USPC ................................................... 84/615, 653
  See application file for complete search history.

(56) References Cited

U.S. PATENT DOCUMENTS

| | | | | | |
|---|---|---|---|---|---|
| 3,340,343 | A | * | 9/1967 | Woll | G10H 1/02 327/117 |
| 3,524,375 | A | * | 8/1970 | Hopping | G10H 1/0558 338/211 |
| 3,555,166 | A | * | 1/1971 | Gasser | G10H 1/342 84/600 |
| 3,662,641 | A | * | 5/1972 | Allen | G10H 1/342 84/702 |
| 3,666,875 | A | * | 5/1972 | Ranzato | G10H 1/342 84/702 |
| 4,078,464 | A | * | 3/1978 | Sugiyama | G10H 1/342 84/744 |
| 4,177,705 | A | * | 12/1979 | Evangelista | G10H 1/342 84/720 |
| 4,336,734 | A | * | 6/1982 | Polson | G10H 1/057 84/646 |
| 4,339,979 | A | * | 7/1982 | Norman | G10H 1/057 84/627 |
| 4,372,187 | A | * | 2/1983 | Berg | G10H 1/342 84/702 |

(Continued)

Primary Examiner — David Warren
(74) Attorney, Agent, or Firm — Zarley Law Firm, P.L.C.

(57) ABSTRACT

A stringless portable electronic training device for a stringed instrument, such as a contrabass, has the shape of a fingerboard with just enough neck to provide realistic left hand position, and just enough body to contain actuators corresponding with strings, electronics, a speaker, and an output jack. On the fingerboard are rows of push buttons corresponding with the location of the notes. The push buttons are held down to select notes which are sounded by actuators at a lower end of the fingerboard. Actuating without the pressing of a button produces the note of the open string. The actuators may include a set of flippers that replicate the plucking of strings and a set of elongated buttons that sustain a bowed sound as they are pressed down. The sound is produced electronically through a built-in speaker and/or output jack.

11 Claims, 4 Drawing Sheets

(56) References Cited

U.S. PATENT DOCUMENTS

| | | | | |
|---|---|---|---|---|
| 4,570,521 A * | 2/1986 | Fox | G10H 1/342 | 200/5 A |
| 4,580,479 A * | 4/1986 | Bonanno | G10H 1/46 | 84/626 |
| 4,658,690 A * | 4/1987 | Aitken | G10H 1/342 | 84/267 |
| D289,900 S * | 5/1987 | Aitken | D17/14 | |
| 4,794,838 A * | 1/1989 | Corrigau | G10H 1/24 | 338/69 |
| 4,986,792 A * | 1/1991 | Chen | G10H 1/32 | 446/302 |
| 5,038,662 A * | 8/1991 | Ho | G09B 15/04 | 84/453 |
| 5,040,447 A * | 8/1991 | Murata | G09B 15/003 | 84/477 R |
| 5,085,119 A * | 2/1992 | Cole | G10H 1/342 | 84/724 |
| 5,286,911 A * | 2/1994 | Murata | G10D 3/16 | 84/615 |
| 5,398,585 A * | 3/1995 | Starr | G10H 1/342 | 84/646 |
| 5,557,057 A * | 9/1996 | Starr | G10H 1/342 | 84/617 |
| 5,739,455 A * | 4/1998 | Poon | G10H 1/0083 | 84/478 |
| 6,111,179 A * | 8/2000 | Miller | G10D 1/085 | 84/423 R |
| 7,112,738 B2 * | 9/2006 | Hyakutake | G10H 1/342 | 84/646 |
| 7,521,619 B2 * | 4/2009 | Salter | G09B 15/00 | 84/470 R |
| 7,973,234 B1 * | 7/2011 | Yang | A63F 13/06 | 273/148 B |
| 8,093,486 B2 * | 1/2012 | Behringer | G10H 1/0008 | 84/615 |
| 8,492,641 B2 * | 7/2013 | Menzies-Gow | G10H 1/0553 | 84/724 |
| 8,608,566 B2 * | 12/2013 | Guinchard | A63F 13/02 | 463/36 |
| 8,796,529 B2 * | 8/2014 | Butera | G10H 1/32 | 84/647 |
| 8,975,501 B2 * | 3/2015 | Roebke | G10H 3/18 | 84/615 |
| 9,117,431 B1 * | 8/2015 | Rudes | G10H 1/32 | |
| 2006/0196343 A1 * | 9/2006 | Yung | G09B 15/00 | 84/470 R |
| 2009/0100992 A1 * | 4/2009 | Elion | G10H 1/0066 | 84/646 |
| 2010/0307314 A1 * | 12/2010 | Piccionelli | G10H 1/342 | 84/285 |
| 2011/0088535 A1 * | 4/2011 | Zarimis | G10H 1/0066 | 84/645 |
| 2011/0283868 A1 * | 11/2011 | Behringer | G10H 1/0008 | 84/622 |
| 2012/0240751 A1 * | 9/2012 | Yonetani | G10H 3/18 | 84/726 |
| 2012/0272814 A1 * | 11/2012 | Menzies-Gow | G10H 1/0553 | 84/724 |
| 2012/0318121 A1 * | 12/2012 | Mittelstadt | G10H 1/342 | 84/743 |
| 2013/0118337 A1 * | 5/2013 | Behringer | G10H 1/0008 | 84/615 |
| 2013/0174717 A1 * | 7/2013 | Butera | G10H 1/32 | 84/609 |
| 2013/0284001 A1 * | 10/2013 | Menzies-Gow | G10H 1/0553 | 84/724 |
| 2014/0290466 A1 * | 10/2014 | Butera | G10H 1/32 | 84/609 |
| 2016/0163298 A1 * | 6/2016 | Butera | G10H 1/342 | 84/615 |

* cited by examiner

ELECTRONIC PUSH-BUTTON CONTRABASS TRAINER

CROSS REFERENCE TO RELATED APPLICATION

This application claims the benefit of U.S. Provisional Application No. 62/234,695 filed Sep. 30, 2015.

BACKGROUND OF THE INVENTION

A double bass, also known as a contrabass viol, or commonly just referred to as a contrabass, is a large acoustic stringed instrument. It typically has a low pitch. The contrabass may be played either with a bow or by plucking. The contrabass typically has a large hollow wooden body that acts as a sounding chamber for the acoustical vibrations made by the instrument's strings. The frequency of the strings can be controlled by adjusting the tension of the strings during tuning of the instrument, and by effectively changing the length of the strings by depressing the strings against a fingerboard on an elongated neck above the hollow wooden body while the instrument is being played. Most commonly the user's left hand is used to finger the strings on the fingerboard, and the right hand is used to cause vibration of the strings either by plucking or bowing the strings. Because of the size and fragility of the instrument, it can be difficult to transport between locations. The physical jarring of movement of the instruments as well as changes in ambient conditions at different locations also tends to adjust the instruments out of tune when they are moved significant distances. Furthermore, the contrabass is often a very expensive instrument, which makes maintaining a practice instrument, for instance at a musician's home, cost prohibitive. For these reasons, it can be difficult for people that play the contrabass, especially students learning how to play, to practice the fingering and bowing techniques associated with playing the instrument.

Accordingly, there is a need for an improved training device that allows practice of the contrabass that is less expensive and more portable than the actual instrument.

BRIEF SUMMARY OF THE INVENTION

According to one embodiment, the present invention is a push-button contrabass that has the shape of a contrabass fingerboard with just enough neck to provide realistic left hand position, and just enough body to contain actuators corresponding with contrabass strings, electronics, a speaker, and an output jack. On the fingerboard are rows of push buttons corresponding with the location of the notes on a contrabass. The push buttons are held down to select notes which are sounded by actuators at a lower end of the fingerboard.

Actuating without the pressing of a button produces the note of the open string, of a contrabass. The actuators include a set of flippers that replicate the plucking of strings, and a set of elongated buttons that sustain a bowed sound as they are pressed down. The latter may be pressed with the stroke of a bow. The sound is produced electronically through a built-in speaker and/or output jack. Because there are no strings, scroll, peg box, bridge, tailpiece or resonating body, this device is small, portable, inexpensive, and requires no tuning or adjustment.

According to another embodiment, the present invention is a musical trainer that has an elongated fingerboard including a plurality of columns of push buttons. Each of the columns of push buttons is formed in a line, and each of the buttons is positioned on the fingerboard on one of the lines to correspond with a finger position of a desired note on a contrabass. Two sets of actuators are in alignment with the lines of push buttons. The electronic processor is in electrical connection with the push buttons to receive a signal indicating which buttons are depressed. The electronic processor is in electrical connection with each actuator to receive an input signal indicating which actuator has been moved. The electronic processor is adapted to send an electrical signal corresponding with a sound that varies depending upon the combination of buttons that are depressed and actuators that have been moved.

DETAILED DESCRIPTION OF THE PREFERRED EMBODIMENT

Figure 1:
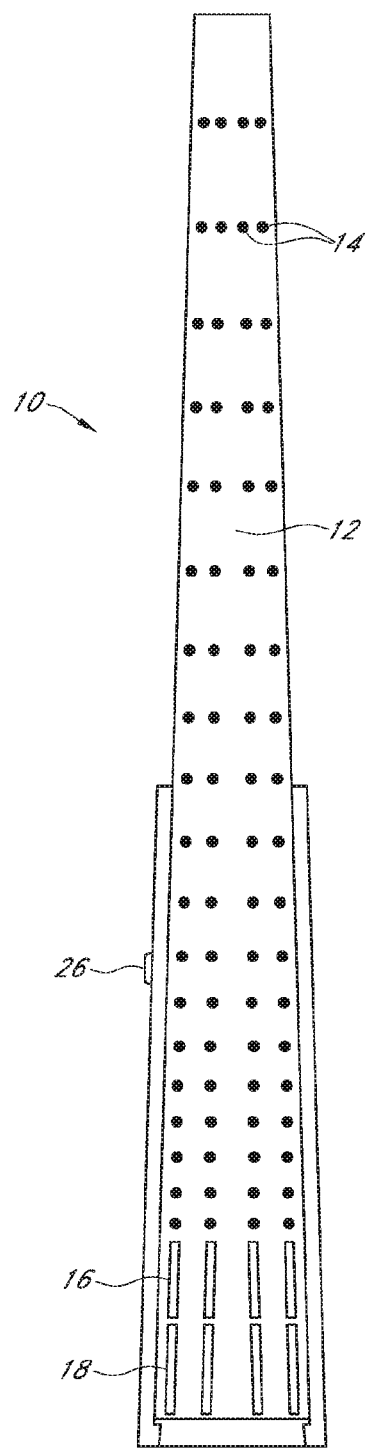
FIG. 1 is a front view of the contrabass musical trainer according to one embodiment of the present invention.
Figure 2:
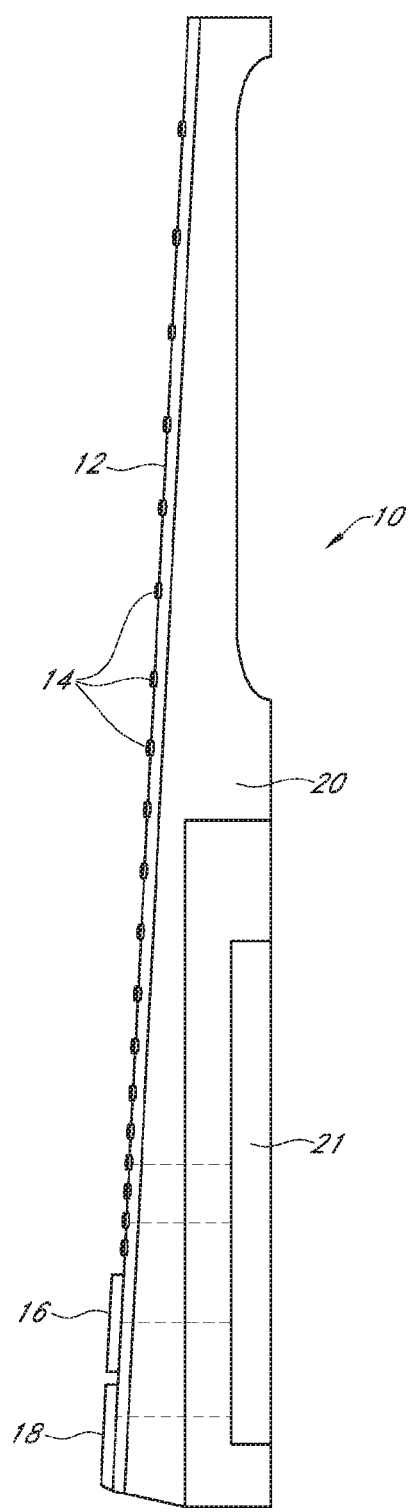
FIG. 2 is a right side elevation view of the contrabass musical trainer of FIG. 1.
Figure 3:
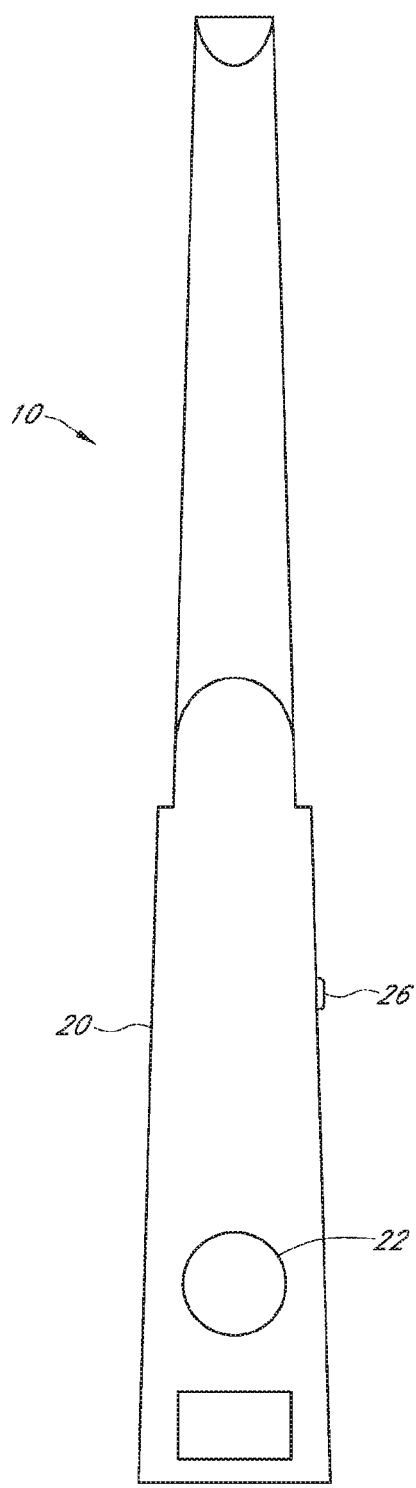
FIG. 3 is a rear elevation view of the contrabass musical trainer of FIG. 1.
Figure 4:
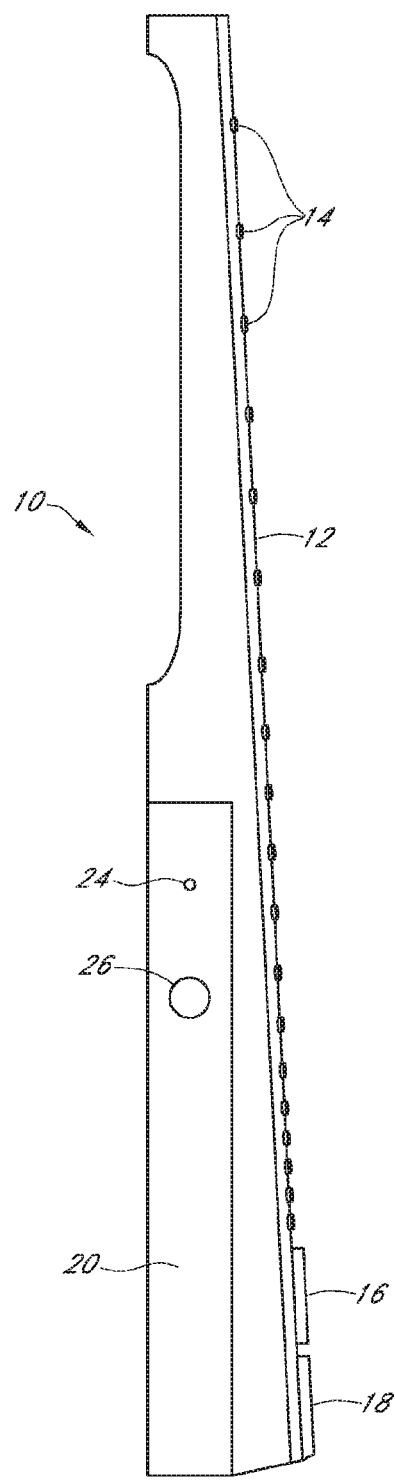
FIG. 4 is a left side elevation view of the contrabass musical trainer of FIG. 1.

FIGS. 1-4 show a contrabass musical trainer 10 according to one embodiment of the present invention. The trainer 10 provides a convenient portable stringless device that permits a user to replicate the fingering and plucking or bowing of a contrabass. The trainer 10 encourages proper finger position while providing auditory feedback to the user. As best seen in FIG. 1, the trainer 10 includes an elongated finger board 12 that includes a plurality of push buttons 14. The push buttons 14 are arranged in columns. In the embodiment shown there are four columns of buttons corresponding with a four-string contrabass. It is contemplated that a different number of columns could be provided, for example five columns to replicate a five-string contrabass. The push buttons 14 in each column are located at a location and spaced apart from adjacent buttons that correspond with the correct finger position of the notes of a contrabass. Accordingly, the space between buttons 14 within a column is greater at the upper portion of the fingerboard than at the lower portion. Pushing any one of the buttons 14 is intended to replicate pushing a string against a fingerboard of a stringed contrabass.

As best seen in FIG. 1, the trainer 10 is also provided with a set of plucking actuators 16 and a set of bowing actuators 18. Each of the actuators 16, 18 are located in alignment with one of the columns of push buttons 14 in order to replicate a string on a contrabass. Accordingly, the embodiment shown includes four plucking actuators 16 and four bowing actuators 18 to correspond with a four-string contrabass. Other numbers of actuators may be used. The plucking actuators 16 may be a flipper style that is biased to a neutral position, and can be actuated by a plucking motion that moves the flipper away from the neutral position in either direction. The bowing actuators 18 may be elongated push buttons that are actuated by applying a pressure that depresses the buttons 18. It is intended that in use the bowing actuators 18 may be actuated either by simply pushing and holding the buttons with a user's fingers, or by using a bow. While not shown, it may be desirable to offset the heights of the bowing actuators 18 so that their neutral positions are not in a single plane, such that a bow can actuate one bowing actuator 18 at a time.

The finger board 12 may be mounted on a body 20 that supports the finger board 12 and contains various electronic components. It is contemplated that the body 20, finger board 12, buttons 14, and actuators 16 and 18 may all be formed from injection molded plastic parts. Other suitable materials may also be used.

The trainer 10 includes an electronic processor 21, such as a computer processor or programmable circuit board that is adapted to receive electrical input signals from the push buttons 14 and actuators 16, 18 and process those input signals to generate a corresponding output signal that generates a sound corresponding to the sound a contrabass would make. The output signal from the processor may be provided directly to an included speaker 22 (FIG. 3) or to an output jack 24 (FIG. 4) that can be connected to an external speaker or headphones (not shown). A volume adjustment knob 26 (FIG. 4) may be provided to adjust the volume of the sound produced.

The processor should be adapted to interpret the combination of buttons 14 pushed and actuators 16 and 18 to produce a sound that corresponds with sound a contrabass would make if the fingering corresponding with the pushed buttons 14 was performed on strings of a contrabass when the corresponding strings are activated either by plucking or bowing. Accordingly, a sustained bowing sound should be produced while a bowing actuator 18 is depressed. A shorter sound that fades should be emitted when a plucking actuator 16 is actuated, similar to the sound produced if a string is plucked on a contrabass. If an actuator 16, 18 is actuated without a button 14 on the corresponding column of buttons being pushed, the sound should be that of an open string. If a button 14 on the corresponding column is pressed, the note produced should correspond to the note of that finger position. If more than one button 14 in the same column is pressed, the note should correspond with the note of the finger position of the pressed button that is closest to the actuator 16, 18.

The trainer 10 may be powered by a battery. Alternatively, other power sources, such as 110 volt AC may be used.

A preferred embodiment of the present invention has been set forth above. It should be understood by one of ordinary skill in the art that modifications may be made in detail, especially in matters of shape, size, and arrangement of parts. Such modifications are deemed to be within the scope of the present invention, which is to be limited only by the broad general meaning of the terms in which the appended claims are expressed.

What is claimed is:

1. A musical trainer comprising:
 a stringless elongated fingerboard including a plurality of columns of push buttons, each of the columns of push buttons formed in a line, each of the buttons positioned on the fingerboard on one of the lines to correspond with a finger position of a desired note on a contrabass;
 a first set of actuators, each of the actuators in alignment with a corresponding one of the lines of push buttons, wherein each of the actuators is manipulated directly by the user;
 an electronic processor in electrical connection with the push buttons to receive a first input signal indicating which buttons are depressed, the electronic processor being in electrical connection with each actuator of the first set of actuators to receive a second input signal indicating which actuator has been moved, the electronic processor adapted to send an electrical signal that varies depending upon the combination of buttons that are depressed and actuators that have been moved; and
 a second set of actuators, each of the actuators in the second set in alignment with a corresponding one of the lines of push buttons, each of the actuators in the second set being in electrical connection with the electronic processor to provide a third input signal to the electronic processor indicating that one of the actuators in the second set has been moved.

2. The musical trainer of claim 1, further comprising a speaker for emitting a sound corresponding with the electrical signal sent by the electronic processor.

3. The musical trainer of claim 1, further comprising a jack in electrical connection with the electronic processor adapted for connection to an external speaker.

4. The musical trainer of claim 1, wherein the first set of actuators comprises flippers that are actuated with a plucking motion and the second set of actuators comprise elongated buttons that are actuated by being pressed to replicate a bowing motion.

5. The musical trainer of claim 4, wherein the electrical signal causes a sound that replicates a contrabass sound corresponding with which push buttons are pushed and which actuators have been moved.

6. A musical trainer, comprising:
 a stringless fingerboard mounted to a body;
 the fingerboard having a plurality of push buttons, a plurality of stringless plucking actuators, and a plurality of stringless bowing actuators, wherein the plurality of plucking actuators and the plurality of bowing actuators are manipulated directly by the user; and
 an electronic processor configured to generate an output signal that generates a corresponding sound based upon input signals received from the plurality of push buttons, plucking actuators, and bowing actuators.

7. A musical trainer, comprising:
 a stringless fingerboard mounted to a body;
 the fingerboard having a plurality of push buttons; and
 an electronic processor configured to generate an output signal that generates a corresponding sound based upon input signals received from the plurality of push buttons, stringless plucking actuators, and stringless bowing actuators.

8. The musical trainer of claim 7 wherein the plucking actuators and bowing actuators are positioned in alignment with the plurality of push buttons.

9. The musical trainer of claim 8 wherein the bowing actuators are configured as elongated push buttons.

10. The musical trainer of claim 9 wherein the bowing actuators have offset heights from one another.

11. The musical trainer of claim 7 wherein the plucking actuators are configured as flippers having a bias towards a neutral position.

* * * * *